US010176156B2

(12) United States Patent
Wessling et al.

(10) Patent No.: US 10,176,156 B2
(45) Date of Patent: Jan. 8, 2019

(54) SYSTEM AND METHOD FOR PROVIDING LINKED NOTE-TAKING

(71) Applicant: Microsoft Technology Licensing, LLC, Redmond, WA (US)

(72) Inventors: Cynthia D. Wessling, Redmond, WA (US); Apeksha Godiyal, Redmond, WA (US); Mustafa Bilal, Redmond, WA (US); Charles Duze, Redmond, WA (US); James M. Krantz, Redmond, WA (US); Abraham Mathew, Redmond, WA (US); Thomas C. Underhill, Redmond, WA (US); Cassandra Lewis, Redmond, WA (US); Chad Nedzlek, Redmond, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 584 days.

(21) Appl. No.: 13/664,073

(22) Filed: Oct. 30, 2012

(65) Prior Publication Data

US 2014/0123002 A1    May 1, 2014

(51) Int. Cl.
*G06F 17/00* (2006.01)
*G06F 17/24* (2006.01)

(52) U.S. Cl.
CPC ................. *G06F 17/241* (2013.01)

(58) Field of Classification Search
CPC .................................... G06F 17/241
USPC ................................. 715/241, 230
See application file for complete search history.

(56) References Cited

U.S. PATENT DOCUMENTS

| 6,551,357 | B1 | 4/2003 | Madduri | |
|---|---|---|---|---|
| 7,801,951 | B2* | 9/2010 | Fishkin et al. | 709/203 |
| 7,962,853 | B2* | 6/2011 | Bedi et al. | 715/751 |
| 7,966,556 | B1* | 6/2011 | Bourdev | 715/230 |
| 2003/0076352 | A1 | 4/2003 | Uhlig et al. | |
| 2003/0097410 | A1* | 5/2003 | Atkins et al. | 709/206 |

(Continued)

FOREIGN PATENT DOCUMENTS

| CN | 1184539 | 6/1998 |
|---|---|---|
| CN | 101018315 | 8/2007 |

(Continued)

OTHER PUBLICATIONS

PCT International Search Report and Written Opinion in International Application PCT/US2013/067360, dated Aug. 1, 2014, 11 pages.

(Continued)

*Primary Examiner* — Mohammed H Zuberi

(57) ABSTRACT

A method for providing linked note-taking includes receiving a notification from an online presentation service presenting a document that a note file relating to the document has been created in a client application, requesting at least a portion of the document and document information from the online presentation service, receiving, from the online presentation service, the at least a portion of the document and document information retrieved from a client application where the document resides, receiving a note within the note file and associating the note with at least a portion of the document and document information without locally opening the document in the client application.

20 Claims, 8 Drawing Sheets

(56) References Cited

U.S. PATENT DOCUMENTS

| | | | |
|---|---|---|---|
| 2004/0085354 A1* | 5/2004 | Massand | G06F 17/2229 715/751 |
| 2006/0092291 A1* | 5/2006 | Bodie | 348/231.99 |
| 2007/0200921 A1 | 8/2007 | Horikiri | |
| 2009/0094514 A1 | 4/2009 | Dargahi et al. | |
| 2010/0278453 A1* | 11/2010 | King | 382/321 |
| 2011/0153744 A1 | 6/2011 | Brown | |
| 2011/0202825 A1 | 8/2011 | Volsky | |
| 2011/0238768 A1* | 9/2011 | Habets | G06F 11/0748 709/206 |
| 2011/0252309 A1 | 10/2011 | Simmons et al. | |
| 2012/0252353 A1* | 10/2012 | Cok et al. | 455/3.06 |
| 2012/0254708 A1* | 10/2012 | Cok et al. | 715/202 |
| 2012/0254709 A1* | 10/2012 | Cok et al. | 715/202 |
| 2013/0132814 A1* | 5/2013 | Mangini et al. | 715/230 |

FOREIGN PATENT DOCUMENTS

| | | |
|---|---|---|
| CN | 101401098 | 4/2009 |
| EP | 1536348 A1 | 6/2005 |

OTHER PUBLICATIONS

Chiu P., et al., "LiteMinutes: an Internet-based system for multimedia meeting minutes", Proceedings of the International Conference on World Wide Web, May 2, 2001, pp. 148-149, XP882316518, abstract, figure 7, p. 145, 10 pages all together.

Kahan, J. et al., "Annotea: an open RDF infrastructure for shared Web annotations", Computer Networks, Elsevier Science Publishers B.V., Amsterdam, NL, vol. 39, No. 5, Aug. 5, 2002, pp. 589-608, XP004369434, abstract.

"WikiNotePad for iPad brings easy linked note taking to App Store", Published on: Apr. 4, 2011, Available at: http://ipadcto.com/2011/04/04/wikinotepad-for-ipad-brings-easy-linked-note-taking-to-app-store/, 6 pages.

"Using Cloud Storage and Note-taking Applications", Retrieved on: Mar. 23, 2012, Available at: http://www.tvdsb.ca/webpages/takahashid/paperless.cfm?subpage=137124, 2 pages.

Selix, Jimmy, "Springpad: What is it and how to get started", Retrieved on: Mar. 23, 2012, Available at: http://www.tech-recipes.com/rx/11288/springpad-what-is-it-and-how-to-get-started/, 4 pages.

Anjum, Umar, "10 Online Note Taking Web Services Every Internet User Should Know About", Published on: Jun. 24, 2011, Available at: http://www.smashingapps.com/2011/06/24/10-online-note-taking-web-services-every-internet-user-should-know-about.html, 9 pages.

"What's new in OneNote 2010", Retrieved on: Mar. 23, 2012, Available at: http://office.microsoft.com/en-us/onenote-help/what-s-new-in-onenote-2010-HA010380196.aspx, 6 pages.

PCT $2^{nd}$ Written Opinion in International Application PCT/US2013/067360, dated Jan. 23, 2015, 6 pgs.

European Office Action in Application 13789929.0, dated Jul. 2, 2015, 2 pgs.

Chinese Office Action in Application 201380057394.8, dated Oct. 9, 2016, 12 pages.

"Second Office Action Issued in Chinese Patent Application No. 201380057394.8", dated Aug. 2, 2017, 12 Pages.

"Third Office Action Issued and Search Report in Chinese Patent Application No. 201380057394.8", dated Apr. 10, 2018, 12 Pages.

* cited by examiner

200 

---

202
recognizing that a document is being presented via an online presentation service

204
sending a notification to an online presentation service presenting a document that a note file relating to the document has been created in a note-taking application

206
requesting at least a portion of the document and document information from the online presentation service

208
receiving, from the online presentation service, the at least a portion of the document and document information retrieved from a client application where the document resides

210
receiving a note relating to the presented document within the note file without locally opening the document in the client application

212
storing, with the note, the at least a portion of the document and document information without locally opening the document in the client application, further including providing a location marker within the note indicating that the note is associated with the at least a portion of the document.

FIG. 2

500 

502
receiving a document presentation selection, the document presentation selection being a request to view a document created in a client application in an online presentation service

504
retrieving the document and associated document information from the client application

506
presenting the document in the online presentation service

508
providing an entry point to a note-taking application in communication with the online presentation service

510
receiving a request for at least a portion of the presented document and document information

512
sending the at least a portion of the document and document to the note-taking application such that, when the input note is accessed in the note-taking application, the at least a portion of the document and the document information are displayed in the note-taking application without locally opening the document in the client application

FIG. 5

SYSTEM AND METHOD FOR PROVIDING LINKED NOTE-TAKING

BACKGROUND

Note-taking applications allow users to gather and organize text, pictures, digital handwriting, and audio and video recordings, as well as manage tasks, and, in some instances, share information with other users. These note-taking applications generally provide streamlined data management and improved organizational efficiency and productivity by storing and managing multiple users' notes in one location. It is with respect to this general environment that embodiments of the present disclosure are directed.

SUMMARY

This summary is provided to introduce a selection of concepts in a simplified form that are further described below in the Detailed Description section. This summary is not intended to identify key features or essential features of the disclosure subject matter, nor is it intended to be used as an aid in determining the scope of the disclosure.

A linked note-taking system and method providing an association between a document created in a client application and a note corresponding to the document created using a note-taking application is disclosed. The document may be presented to a user through an online presentation service. A note relating to the document may be created via the note-taking application and may be associated to the document presented in the online presentation service. A note may be created without also locally opening the document through the client application where the document resides. To associate a note with a presented document, document information may be retrieved by the note-taking application from the online presentation service. The note-taking application may periodically or dynamically request and receive document information from the online presentation service, which may retrieve the information from the client application. Document information received by the note-taking application may be associated with the note to provide context and location information when the note is accessed in the note-taking application.

An embodiment includes a method for providing linked note-taking. The method may include receiving a notification from an online presentation service presenting a document that a note file relating to the document has been created in a client application. The method may further include requesting at least a portion of the document and document information from the online presentation service and receiving, from the online presentation service, the at least a portion of the document and document information retrieved from a client application where the document resides. The method may also include receiving a note relating to the received portion of the presented document within the note file without locally opening the document in the client application, and storing, with the note, the at least a portion of the document and document information. Storing the note with the associated document portion and document information may provide context and location information when the note is accessed at a later time. Specifically, when the note is accessed, the thumbnail version of the associated portion of the document and document information may be displayed with the note. The note-taking application may periodically or dynamically request and receive document information from the online presentation service, which may retrieve the information from the client application.

In another embodiment, a system for providing linked note-taking is disclosed. The system includes at least one processor; a memory, operatively connected to the at least one processor and containing instructions that, when executed by the at least one processor, comprise a note-taking application configured to: receive a notification from an online presentation service presenting a document that a note file relating to the document has been created in a client application; request the note file and at least a portion of the document and document information from the online presentation service; receive, from the online presentation service, the note file and at least a portion of the document and document information retrieved from a client application where the document resides; create a note relating to the presented document within the note file without locally opening the document in the client application, and store the note including the at least a portion of the document and document information, further including, displaying the at least a portion of the document when the note is accessed in the note-taking application. The note-taking application may periodically or dynamically request and receive document information from the online presentation service, which may retrieve the information from the client application. Document information received by the note-taking application may be associated with the note to provide context and location information when the note is accessed in the note-taking application. When the input note is accessed in the note-taking application, the associated portion of the document and document information are displayed with the note in the note-taking application.

In another embodiment, a computer-readable medium comprising executable instructions that, when executed by a processor, provide linked note-taking is also disclosed. The computer-readable medium includes instructions executable by the processor for: recognizing that a document is being presented via an online presentation service; receiving a notification from an online presentation service presenting a document that a note file relating to the document has been created in a client application; requesting the note file and at least a portion of the document and document information from the online presentation service; receiving, from the online presentation service, the note file, a thumbnail version of at least a portion of the document and document information retrieved from a client application where the document resides; receiving a note relating to the received portion of the presented document within the note file without locally opening the document in the client application, and storing, with the note, the at least a portion of the document and document information, further including, storing the thumbnail version of the at least a portion of the document and document information, further including providing a location marker within the note indicating that the note is associated with the at least a portion of the document, wherein, when the note is accessed in the note-taking application the thumbnail version of the at least a portion of the document and document information display. The note-taking application may periodically or dynamically request and receive document information from the online presentation service, which may retrieve the information from the client application.

In another embodiment, a computer-readable medium comprising executable instructions that, when executed by a processor, provide linked note-taking is disclosed. The computer-readable medium including instructions executable by the processor for: retrieving a document and associated document information from a client application; presenting the document in the online presentation service; providing an entry point to a note-taking application in communication with the online presentation service; receiving a request from the note-taking application for at least a portion of the presented document and document information, wherein the note-taking application is not in communication with the client application where the document resides; and sending the at least a portion of the document and document to the note-taking application such that, when the input note is accessed in the note-taking application, the at least a portion of the document and the document information are displayed in the note-taking application without locally opening the document in the client application.

BRIEF DESCRIPTION OF THE DRAWINGS

Referring now to the drawings in which like reference numbers represent corresponding parts throughout:

FIG. 2 is a flowchart of a method for providing linked note-taking according to an embodiment of the disclosure;

FIG. 5 is a flowchart of a method for providing linked note-taking according to an embodiment of the disclosure.

DETAILED DESCRIPTION

In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

Embodiments of the present disclosure provide linked note-taking via an online presentation service and a note-taking application. Embodiments of the present disclosure discussed below in further detail may provide an association between a note created in a note-taking application and a document or a portion of a document created in a client application. The document may be made available for viewing in the online presentation service and a note may be created and associated with the document without locally opening the document in the client application, or opening the client application. Similar processing may occur if the note-taking application is stand-alone or web-based.

Figure 1:
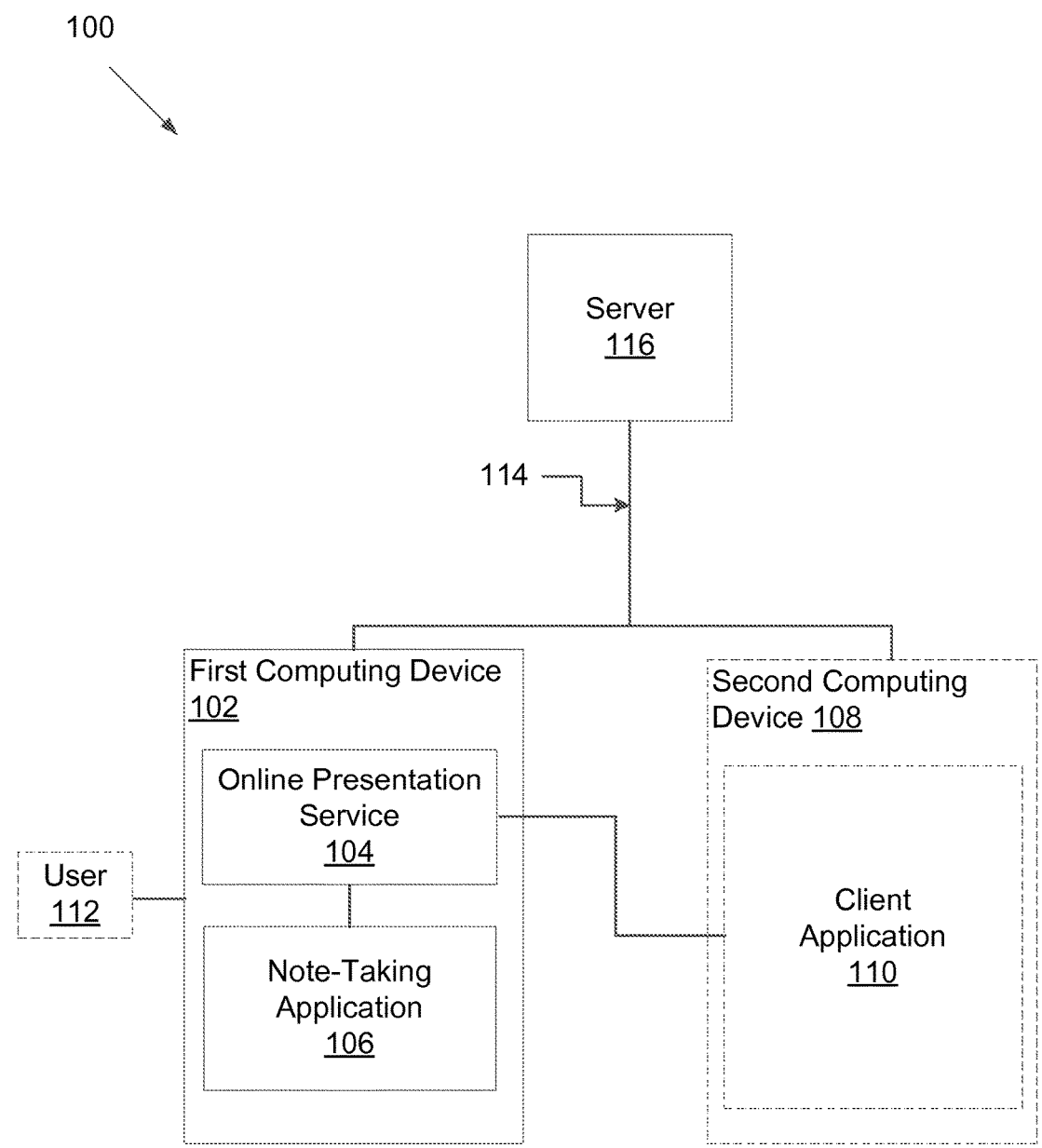
FIG. 1 illustrates the high level architecture of a system for providing linked note-taking according to an embodiment of the disclosure.

FIG. 1 illustrates the high level architecture of a system 100 for providing linked note-taking according to one embodiment. The system shown in FIG. 1 is for illustration purposes only. Other configurations are also contemplated. System may include an online presentation service 104 and a note-taking application 106 running, for instance, on a first computing device 102. System 100 may communicate with a second computing device 108 on which a client application 110 may reside. The second computing device 108 and the client application 110 are shown in dashed lines to indicate that the second computing device 108 and the client application 110 are not necessarily a part of the system 100 but may interact with one or more components of the system 100. The online presentation service 104 may be capable of receiving a document and document information from the client application 110. In alternative embodiments, the online presentation service 104, the note-taking application 106, and the client application 110 may be installed and accessible from the same computing device. In such instances, the document may not be accessible from the client application 110 (due, for instance, to permissions set on the document), but may be presented to a user via the online presentation service 104 for viewing during a certain time period or for a specific purpose (e.g., to review a section of the document).

Prior to retrieval of the document from the client application 110, the document may be formatted for presentation by the client application 110. For example, a first user may create or open a slide presentation in slide presentation application (e.g., Microsoft® PowerPoint). The first user may select to present the slide presentation online via a web service that provides document presentation (e.g., online presentation service 104). The note-taking application 106 may receive an indication that a note file (e.g., a notebook) relating to a document presented via the online presentation service 104 has been created. A second user (e.g., user 112) may view the presented document via the online presentation service 104, and may also input a note into the note file relating to the document via the note-taking application 106. The user 112 is also shown in dashed lines to indicate that the user 112 is not necessarily a part of the system 100 but may interact with one or more components of the system 100. The note-taking application 106 may request document information from the online presentation service 104, and may then associate the input note to the presented document. For instance, the note-taking application 106 may send the online presentation service 104 an indication that a note relating to the presented document is being created and/or modified. The online presentation service 104 may be configured to request and retrieve document information from the client application 110 and send the document information to the note-taking application 106. The note-taking application 106 may receive the document information and associate received document information with the note to provide document context and location information within the note. In some instances, when the note is accessed in the note-taking application 106 (e.g., at a later time), the associated portion of the document and document information are displayed with the note in the note-taking application 106 without opening the document in the client application 110 where the document resides.

In some examples, client application 110 may be an application used to prepare or display text or other media for an online presentation, such as a word processing application, a note taking application, a slide presentation application, a spreadsheet application, a web browser application, an image or video application, or the like. Thus, documents may be word processing documents, videos, digital photographs, spreadsheets, presentations (e.g., slide show presentations), web pages, etc. The first and second computing devices 102, 108 may be any computing devices including, but not limited to, desktop computers, laptop computers, servers, handheld computers, vehicle mount computers, smart phones, and comparable devices. In some embodiments, the online presentation service 104 may be a web service (e.g., a cloud based service). The online presentation service 104 may be any web-based service used to present a document in a web browser. The online presentation service 104 may also be used to conduct an online meeting such as a conferencing application, which may be web or server based. For instance, online presentation service 104 may be an online meeting organizer software application to conduct an online meeting by online presentation of real-time audio and/or video of the meeting to meeting attendees. To this end, the online presentation service 104 may be configured to communicate with the client application 110 to retrieve document information from the client application 110 for a document presentation or an online meeting. The note-taking application 106 may be a dedicated note-taking application, (e.g., Microsoft® OneNote®), or a web-based note-taking application (e.g., Microsoft® OneNote® Web App). Communications between applications running on the first and second computing devices 102, 108, or any applications running on the first and second computing devices 102, 108, may be accomplished over a network 114. In non-limiting examples of the disclosure, the network 114 may provide communication between any of the components described herein. To this end, the network 114 may comprise any topology of servers, clients, Internet service providers, and communication media. By way of example, and not limitation, the network 114 may include a secure network such as an enterprise network, an unsecure network such as a wireless open network, or the Internet. The network 114 may also coordinate communication over other networks such as Public Switched Telephone Network (PSTN) or cellular networks. Furthermore, the network 114 may include short range wireless networks such as Bluetooth or similar ones. The network 114 may also include wireless media such as acoustic, RF, infrared and other wireless media.

FIG. 2 is a flowchart of a method 200 for providing linked note-taking according to an embodiment of the disclosure. In the embodiments described herein, one or more user interfaces may be provided for each of the applications where a document or note may be retrieved or associated. To this end, FIGS. 3A-4B illustrate online presentation service and note-taking application interfaces. In some embodiments, the method 200 may be implemented via the system components and/or applications described above with respect to FIGS. 1 and 3A-4B. The method 200 may generally include transmitting messages to and from a client application 110 and/or a note-taking application 106 via the online presentation service 104. For instance, the online presentation service 104 may transmit request and response messages via any known transport application. In the embodiments described above, documents and document information may be retrieved and transmitted using the simple object access protocol (SOAP), as is known in the art. In some embodiments, request messages initiated by the online presentation service 104 or the note-taking application 106 may be transmitted via HTTP or HTTPS. In such embodiments, the second computing device 108 running the client application 110 may be configured to listen for HTTP or HTTPS requests.

According to embodiments of the disclosure, the method 200 may include recognizing 202 that a document is being presented via an online presentation service. For instance, to begin linked note-taking, a document (e.g., presentation slide 302 of FIGS. 3A and 3B, etc.) may first be presented via the online presentation service 104. In some embodiments, the online presentation service 104 may be accessed through a browsing application running, for instance, on the first computing device 102. To accomplish document presentation, a document presentation selection may be received by the online presentation service 104 from the client application 110, for instance, from a user (e.g., the document creator) accessing the document in the client application 110. In such instances, the client application 110 may include a mechanism for designating a document as a shared or presented document. When a document has been configured for sharing or presenting, a link to the document may be distributed to one or more other users. Such users typically will not have access to the native client file through the client application (e.g., because the client application is not installed on the user's computing device or the user does not have permission to access the document). In some instances, the link is a uniform resource locator (URL) to the document and may be included in an e-mail message sent to the user 112 or a meeting invitation accessible by the user 112 through a calendaring application (e.g., Microsoft® Outlook®). Thus, requesting to view the document through the online presentation service 104 may include activating the link to the document in the calendaring application such that, upon activation, the document displays in an interface of the online presentation service 104 (e.g., interface 300 of FIGS. 3A-3B, displaying document 302).

Activation of a link to the document may be initiated by a user 112 accessing the online presentation service 104 via the first computing device 102, which may be displaying an interface 300 of the online presentation service 104, but may not have access to either the client application 110 storing the requested document or directly to the requested document within the client application 110 where it resides (e.g., because it is stored locally on, for instance, the second computing device 108). Accordingly, a user 112 operating a first computing device 102 may access a presented version of the document using the online presentation service 104. The note-taking application 106 may similarly be opened on the first computing device 102. When a user accesses the presented version of the document, the note-taking application 106 may recognize that a document is being presented.

Figure 4A:
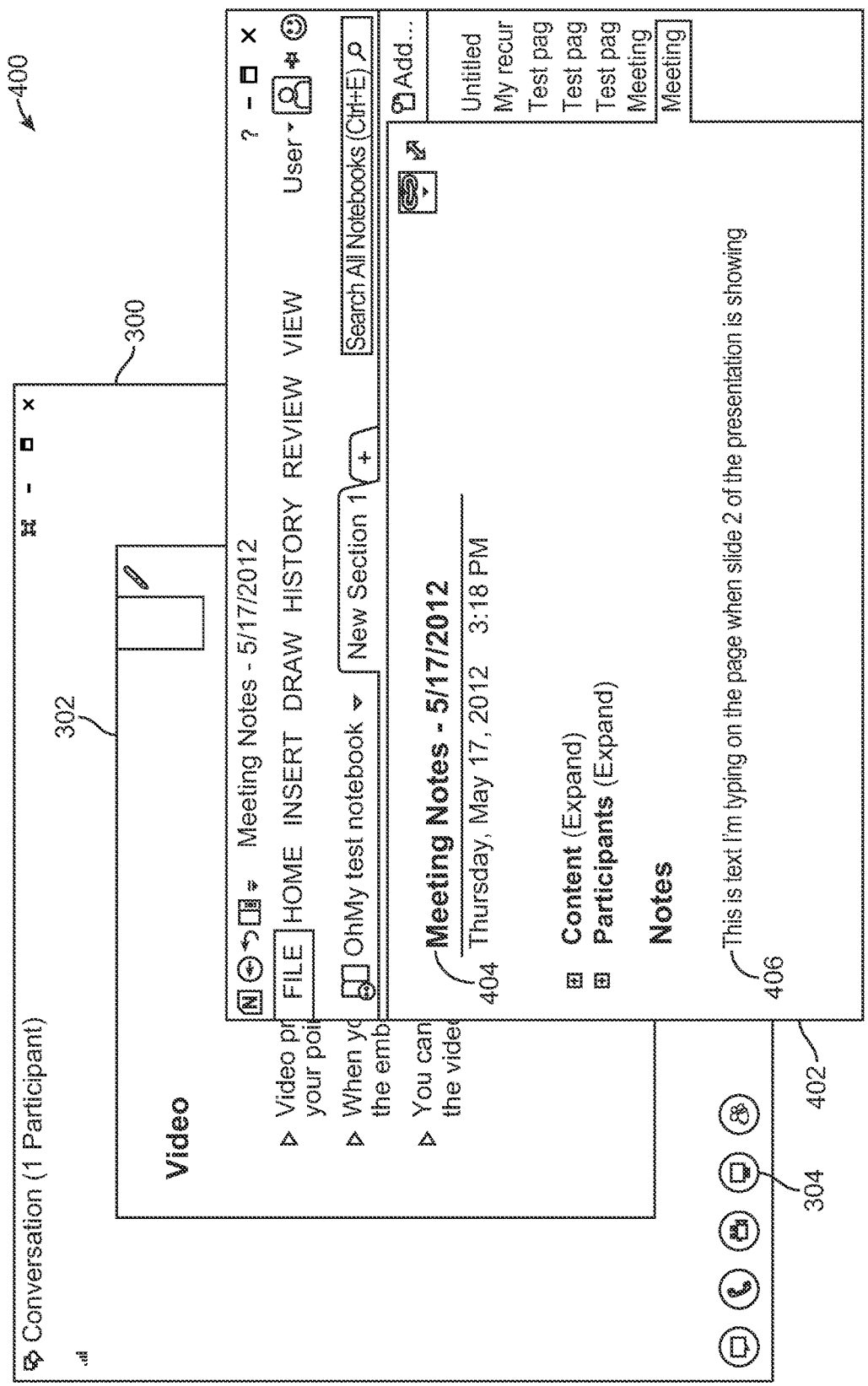
FIGS. 4A-4B illustrate a user interface of a note-taking application in communication with an online presentation service according to an embodiment of the disclosure.

The method 200 may also include receiving 204 a notification from the online presentation service presenting the document that a note file relating to the document has been created in a client application. As discussed above, the note-taking application 106 may be running on the same computing device (e.g., first computing device 102) presenting the document via the online presentation service 104. The note-taking application 106 may also be in networked communication (e.g., via network 114) with the online presentation service 104. During presentation of the document through the online presentation service 104, an indication that a note file associated with a presented document has been created or is being modified may be received by the note-taking application 106 from the online presentation service 104. In some instances, the notification is simply that a note file 404 (e.g., Meeting Notes May 17, 2012 note file of FIGS. 4A-4B) associated with the presented document is made available in the note-taking application 106. Accordingly, the note-taking application 106 may be configured to receive a note file 404 and/or note file information from the online presentation service 104 regarding the presented document. A note file 404 may be created and associated with the presented document. In some instances, the note file 404 may have been created and distributed to the online presentation service 104 by the client application 110, which in turn may send the note file 404 to the locally opened note-taking application 106. The note-taking application 106 may then receive one or more note files 404 relating to the document. For instance, as illustrated in FIG. 4A, the note-taking application 106 may be launched and a note-taking interface 402 may display. The note-taking interface 402 may then receive and display one or more note files 404 relating to the presented document. Note file information (e.g., title, creation date, etc.) may also be retrieved from the client application 110. When the note-taking application 106 receives the note file 404, a user may access the note file 404 and either create a new note 406 relating to the presented document and enter new note text, or open a previously created note saved in the note file 404 relating to the presented document and input additional note text.

The method 200 may also include requesting 206 at least a portion of the document and document information from the online presentation service. For instance, the note-taking application 106 may query the online presentation service 104 to retrieve document information for the presented document. The online presentation service 104 may then query the client application 110 for the document and document information. In some embodiments, document information may include one or more document definitions for the document. Document information may include any type of context information. Context information may include, for instance, a time-stamp or location-stamp for a document associated with a note. Other context information may include location information, such as the slide number for the slide currently being shown in a slide show or the page number where the cursor is in a word processing document, a URL or link to the location of the document, and/or a thumbnail image of the content currently showing in the originating client application 110. In some embodiments, context information may be derived based on one or more of the context properties of the document.

To request at least a portion of a document and document information, the note-taking application 106 may send a query to the online presentation service 104 to retrieve the presented document and any associated document information (e.g., document title, document location, a document thumbnail image, etc.). In certain embodiments, the query may be formatted using a SOAP message. Upon receiving the document request and parameters, the online presentation service 104 may verify the document request. For instance, the online presentation service 104 may verify that a request is properly formatted and includes the elements necessary to process the request. When the request has been verified, the online presentation service 104 may process the document request, retrieve the requested data, and provide a response message.

The method may further include receiving 208, from the online presentation service, the at least a portion of the document and document information retrieved from a client application where the document resides. For instance, when a user types into a note file (e.g., a note-taking application page), the note-taking application 106 may retrieve document information via a request to the online presentation service 104 about the presented document 302. The note-taking application 106 may be configured to receive document information (e.g., the name of an accessed power point presentation) for a document (e.g., presentation slide 302 of FIGS. 3A and 3B) from the online presentation service 104 to provide context for a note corresponding to a document accessed via the online presentation service 104. Document information, such as what a current slide number is or where the presentation file is stored, may be received at regular intervals from the online presentation service 104 to associate a current version of the document with the note. For instance, the online presentation service 104 may constantly or periodically retrieve and transmit document information to the note-taking application 106 for any document accessible through the online presentation service 104. The note-taking application 106 may be configured to receive responses via any message transport mechanism. In some instances, a received response is a response URI recognizable by the note-taking application 106. In such embodiments, messages received by the note-taking application 106 from the online presentation service may be formatted as JSON messages. In these embodiments, a document response may be a JSON response message received by the note-taking application 106 including an object representing the requested document. The response message may further include the requested document information.

Figure 4B:
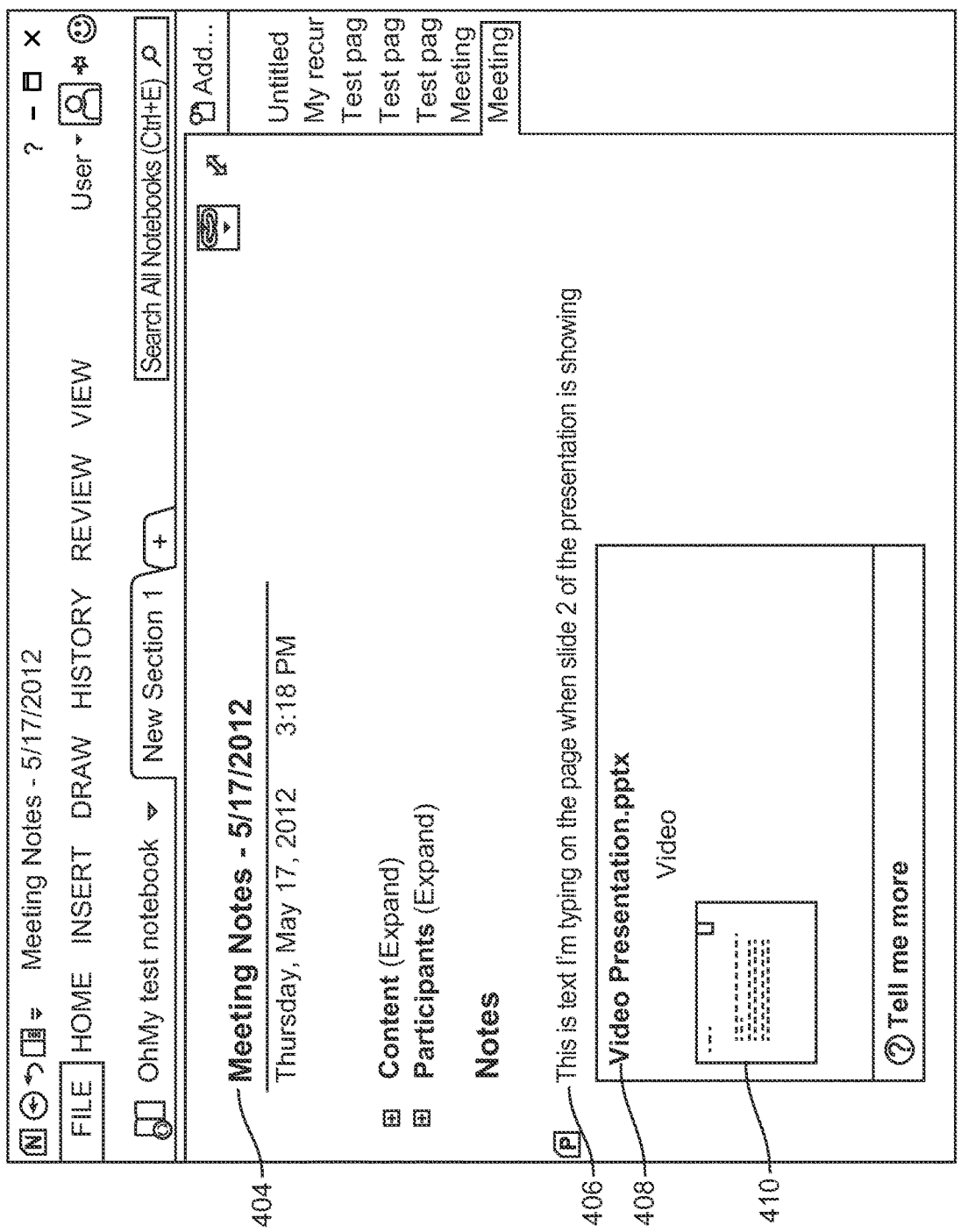

Document information may be derived by retrieving the information from the client application 110, a server 116, or from another source, such as a calendar, an address book, a contact list, a user profile, a user history, or any combination thereof. For example, a context property (e.g., a time stamp) associated with the document when the document is created or modified may be received by the note-taking application 106 upon retrieval of the context property from the client application 110 by the online presentation service 104. The note-taking application 106 may be further configured to display the context information when a user opens a note associated with the document. FIG. 4B illustrates displaying a context property (e.g., Video Presentation.pptx 408) within an interface 402 of the note-taking application 106.

The method 200 may further include receiving 210 a note relating to the received portion of the presented document within the note file without locally opening the document in the client application. The note may be received within the note file 404 relating to the presented document 302. In some instances, the note may be a user input note relating to the at least a portion of the presented document 302. For instance, as illustrated in FIGS. 4A-4B, input note text relating to at least a portion of the presented document 302 may be received (e.g., "This is text I'm typing on the page when slide 2 of the presentation is showing" 406). The note-taking application 106 may allow each of the users (e.g., user 112) viewing the presented document 302 to create one or more notes relating to the document 302. Notes can include text, audio media, visual media, audio-visual media, recorded data, a weblink, a pointer to an information source (e.g. a bookmark), or any other type of data. Notes created by a user may be transmitted from the first computing device 102 to a server 116 in communication with the online presentation service 104 for storage in a database. Stored notes may then be accessed at a later time in the client application 110, the online presentation service 104, or the note-taking application 106. Similar processing may occur if the note-taking application 106 is stand-alone (e.g., a rich client version) or web-based.

The method 200 may further include storing 212, with the note, the at least a portion of the document and document information. For instance, when a note relating to a presented document 302 has been added to a note file 404 within the note-taking application 106, the note, at least a portion of the document, and document information may be saved in the note-taking application 106 and accessed at a later time. Storing the note and the associated document portion and document information may provide context and location information when the note is accessed at a later time. In some embodiments, when the note is accessed, a thumbnail version of the associated portion of the document and document information may be displayed with the note. As illustrated in FIG. 4B, a thumbnail version 410 of the document 302 and document information (e.g., Video Presentation.pptx 408) may also be displayed when the note file 404 is accessed. Stored notes may be accessed using the client application 110, the online presentation service 104, or the note-taking application 106. Any document information for the presented document received by the note-taking application 106 may be saved with the note file. For instance, document information relating to the document stored in the note file 404 may be attached to the note (e.g., attached to the input note text). Thus, when the note is accessed in, for instance, the note-taking application 106, the associated at least a portion of the document and document information are also displayed in the note-taking application 106. For example, if the document 302 is a slide show presentation, document information such as the currently-showing slide number and title, the presentation name and location, and a thumbnail image of the currently-showing slide may be retrieved and displayed. As is illustrated in FIG. 4B, within the note-taking interface, one or more note files (e.g., Meeting Notes May 17, 2012 404) may be accessed and any stored note text (e.g., "This is the text I'm typing on the page when slide 2 of the presentation is showing" 406) as well as document information (e.g., Video Presentation.pptx 408) are displayed. In some embodiments, a user 112 may select (e.g., hover over or click on) the associated text in the note-taking application 106 and, upon selection of the associated text, additional document information may be displayed.

Updated document information may be periodically or dynamically received by the note-taking application 106, stored in a note-taking application file associated with the document, and attached to the created note. To this end, the note file 404 may be dynamically or periodically updated. For instance, if a client application user accesses the document 302 and makes changes, those changes are visible when a remote note-taking application user accesses a note file 404 associated with the document 302. Both context information (e.g., page number, cursor location, etc.,) as well as substantive document information (document text, graphics, etc.) may be updated. In some embodiments, once a note file 404 has been associated with a presented document 302, document information may automatically update in the note. For example, if the text of a slide show slide is modified, in, for example, the client application 110, the note-taking application 106 may receive the updated document information. A thumbnail 410 of the presented document portion may also update to reflect modifications made in the client application 110.

The method 200 may also include providing a location marker within the note indicating that the note is associated with the at least a portion of the document. Within the note-taking interface 402, one or more note files 404 may be accessed and any stored note text (e.g., "This is the text I'm typing on the page when slide 2 of the presentation is showing" 406) may be displayed in proximity to the presented document portion (e.g., a slide, a paragraph or cursor location, a cell of a spreadsheet, a frame of a video, etc.). A note file 404 accessed at a later time may also be shared or edited.

Figure 3A:
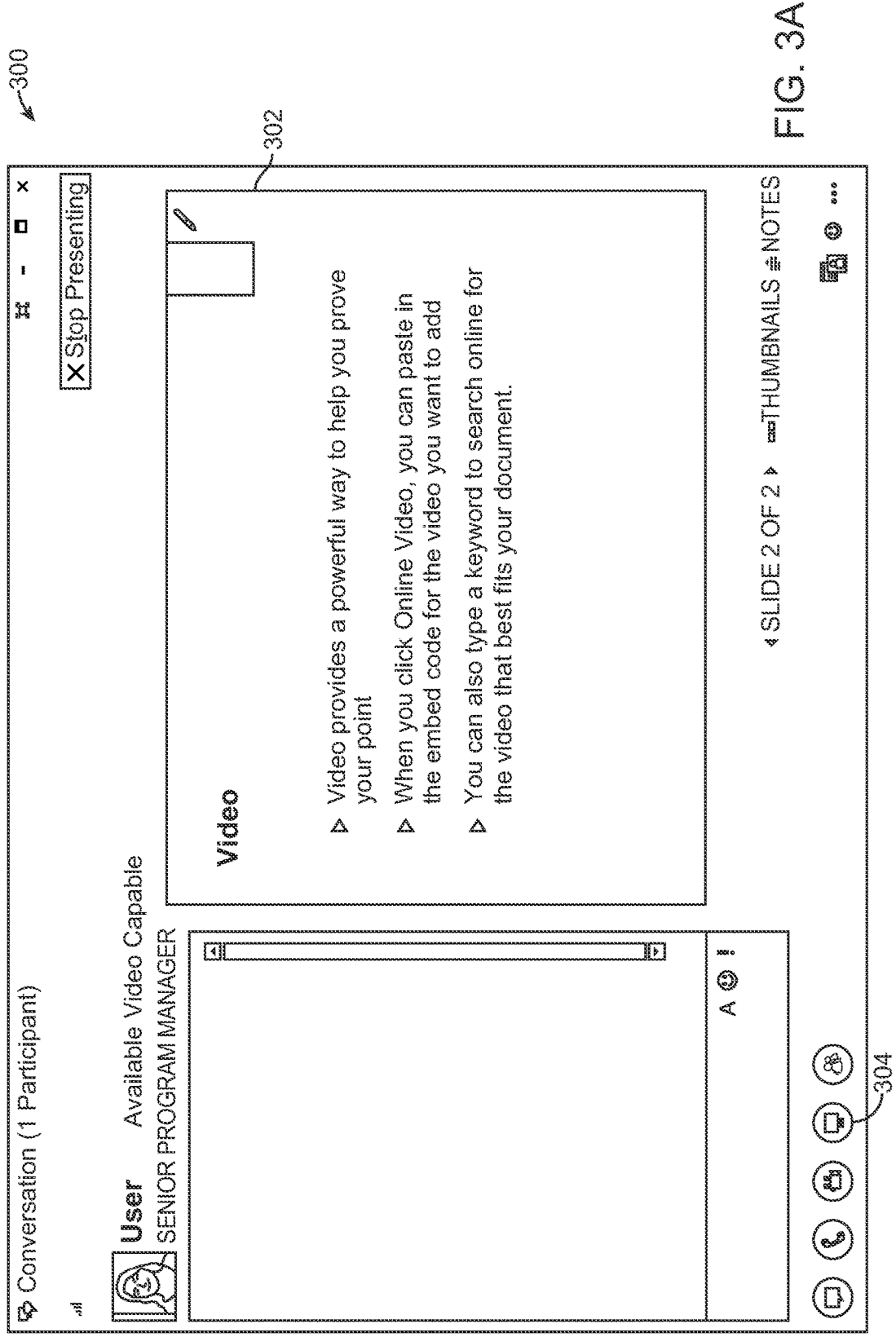
FIGS. 3A-3B illustrate a user interface of an online presentation service according to an embodiment of the disclosure.
Figure 3B:
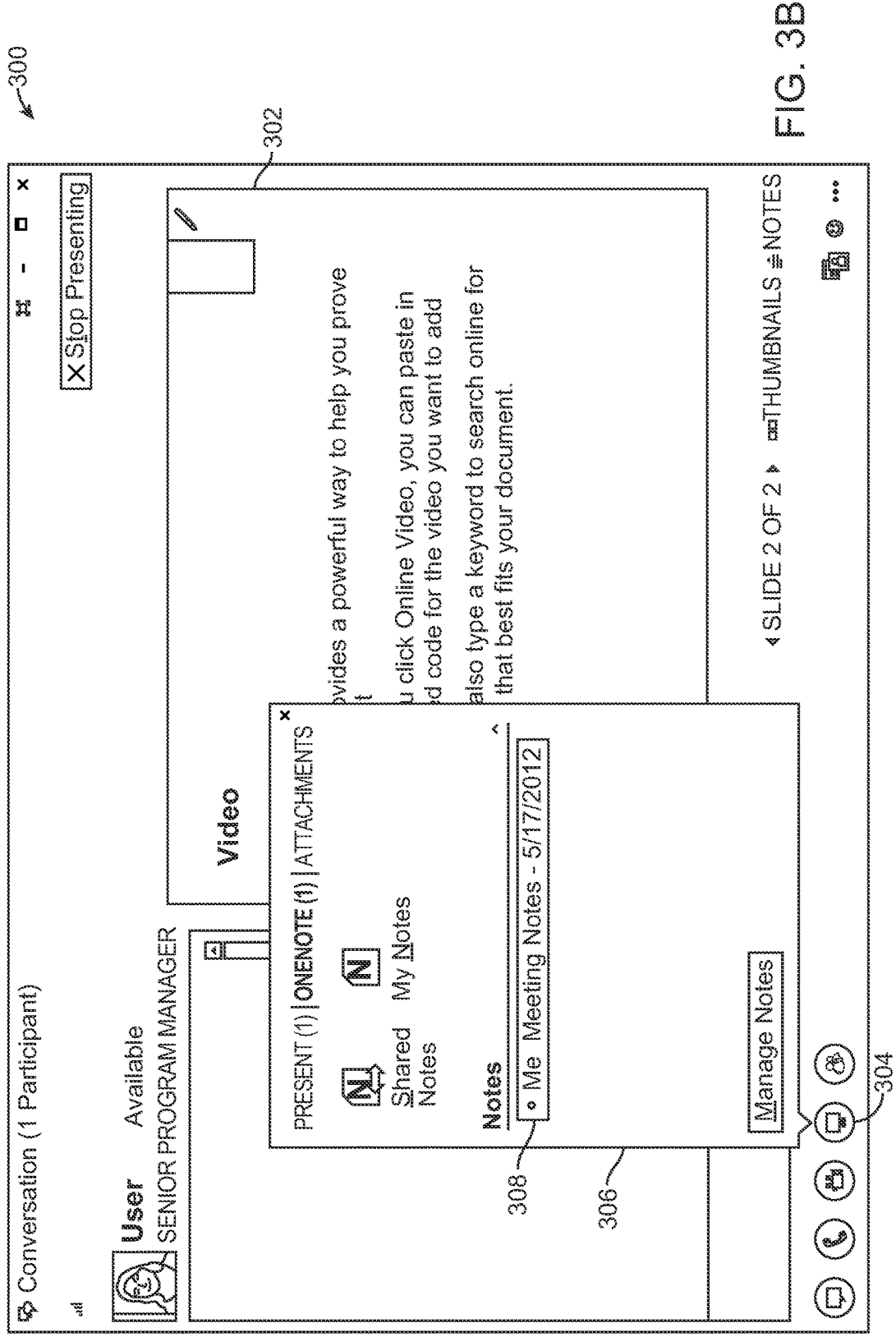

From the perspective of the online presentation service 104, a method and computer-readable medium comprising executable instructions that, when executed by a processor, provide a method for linked note-taking may also be disclosed. FIG. 5 is a flowchart of a method 500 for providing linked note-taking according to an embodiment of the disclosure. FIGS. 3A-3B illustrate an online presentation service interface 300 that may be utilized to present a document and provide access to a note-taking application in communication with the online presentation service. More specifically, FIG. 3A illustrates an interface 300 of an online presentation service, and FIG. 3B illustrates the online presentation service interface 300 and a note file information interface 304 within the online presentation service interface 300. In some embodiments, the method 500 may be implemented via the system components and/or applications described above with respect to FIGS. 1 and 3A-4B. The method 500 may generally include transmitting messages to and from a client application 110 and/or a note-taking application 106 via the online presentation service 104.

The method 500 may include receiving 502 a document presentation selection. The document presentation selection may be a request to view a document created in a remote client application (e.g., client application 110 running on second computing device 108). In some embodiments, the online presentation system 106 may be configured to recognize that a user is requesting to view a document in the online presentation service 104, as discussed above with respect to method 200. The method 500 may also include retrieving 504 the document and associated document information from the client application. For instance, the online presentation service 104 may retrieve the document and relevant document information from the client application 110. To retrieve the document and document information, the online presentation service 104 may send a request to the client application 110 to access the document to be presented, and may also be configured to receive the requested document and any associated document information (e.g., document title, document location, a document thumbnail image, etc.) from the client application 110. As stated above, in certain embodiments, the queries may be formatted using a SOAP message. Upon receiving the document request and parameters, the client application 110 may verify the document request. For instance, client application 110 may verify that a document request is properly formatted and includes the elements necessary to process the request. When the request has been verified, the client application 110 may process the document request, retrieve the requested data, and provide a response message.

To receive the document and document information, the online presentation service 104 may be configured to receive responses via a response URI recognizable by the online presentation service 104 from the client application 110. In such embodiments, messages received by the online presentation service 104 from the client application 110 may be formatted as JSON messages. In these embodiments, a document response may be a JSON response message, received by the online presentation service 104, which may include an object representing the requested document. The response message may further include the requested document information. The online presentation service 104 may request documents and document information via, for instance, a put synch data request. The online presentation service 104 may receive the requested document and document information from the client application 110. Returned data may be in the form, for example, of an executable link to the document. For instance, the online presentation service 104 may receive a string specifying a fully qualified URL to document (e.g., a word processing document, a slide show, a video, etc.) stored in the client application 110.

The method 500 may further include presenting 506 the document in an online presentation service. Upon retrieving the document and document information, the online presentation service 104 may display the requested document 302 along with any relevant document information. To this end, embodiments of the disclosure are also directed to one or more user interfaces accessible via the online presentation service 104. In some embodiments, the user interface of the online presentation service 104 may include one or more buttons (or other selectable icons) for initiating an action specific to retrieving a document or a note associated with a document. In such embodiments, a single click of a button on the user interface may initiate communication of the note-taking application 106 with the online presentation service 104. As shown in FIGS. 3A and 3B, document 302 may be displayed with an interface 300 of the online presentation service 104. In some embodiments, upon activation of a link to the document, the online presentation service 104 may then initiate retrieval and display of the document (e.g., presentation slide 302 of FIGS. 3A and 3B) in the interface 300 of the online presentation service 104.

The method 500 may also include providing 508, via the online presentation service, an entry point to a note-taking application in communication with the online presentation service. In some embodiments, selection of a note file 308 may initiate the execution of the note-taking application 106. In these embodiments, a note file 308 itself may be configured to be a note-taking application entry point. The online presentation service 104 may first receive a selection of a note file interface icon 304. FIG. 3B illustrates a selectable icon 304 for launching a note file interface 306. Upon selection of the note file interface icon 304, a note file information interface 306 may display. In some embodiments, a note file 308 associated with the presented document 302 may be displayed within the note file interface 306. The note file 308 may have been created by, for instance, the document creator. The note file 308 may have also been previously associated with the presented document 302 via the client application 110 or the note-taking application 106. The online presentation service 104 may recognize that a note file 308 has been created and/or associated with the displayed document and display the note file 308 within the note information interface 306.

A note file 308 may be selected within the note file interface 306. In some embodiments, when the online presentation service 104 receives a selection of a note file 308, the note-taking application 106 may launch and a note-taking interface (e.g., note-taking interface 402 of FIGS. 4A-4B) may display. The note-taking application 106 may then allow a user (e.g., user 112) viewing the presented document to create and/or modify one or more notes relating to the presented document. As discussed above, notes can include text, audio media, visual media, audio-visual media, recorded data, a weblink, a pointer to an information source (e.g. a bookmark), or any other type of data. In some embodiments, notes created by a user may be transmitted from the first computing device 102 to a server 116 in communication with the online presentation service 104 for storage in a database.

A note file 308 accessible via the online presentation service 104 and associated with a presented document 302 may be shared with all or at least a portion of meeting participants. The online presentation service 104 may be configured to receive additional notes within a previously created note file. In some embodiments, online presentation service 104 may receive an indication that an input note has been created or modified in the note-taking application 106 and saved to a note file associated with the presented document. Thus, the note file interface 306 may be updated as notes created, for instance, in note-taking application 106, are associated with the presented document 302. Further, if the document 302 has already been associated with one or more shared notes, the online presentation service user interface 300 may display a visual indication that a shared note is available for viewing. Notes may be shared during an online meeting conducted with the online presentation service 104. Meeting attendees may open the notes directly from the notification. In another example, the online presentation service 104 may be assigned a persistent link in a meeting notes page to find and open any notes that have been shared with a meeting.

The method 500 may further include receiving 510 a request for at least a portion of the presented document and document information. For instance, the online presentation service 104 may receive a request from the note-taking application 106 for at least a portion of the presented document and document information. The method may also include sending 512 the at least a portion of the document and document to the note-taking application. When the input note is accessed in the note-taking application 106, the at least a portion of the document and the document information are displayed in the note-taking application 106 without locally opening the document in the client application 110. As described above, the presented document and document information may be regularly updated within the online presentation service 104 so that a most current version of the document portion is displayed upon accessing the note file in the note-taking application 106.

The example systems and methods in FIGS. 1-5 have been described with specific client devices, applications, modules, and interactions that may execute in conjunction with an application program that runs on an operating system on a personal computer. Embodiments are not limited to systems according to these example configurations. Furthermore, specific protocols and/or interfaces may be implemented in a similar manner using the principles described herein.

Figure 6:
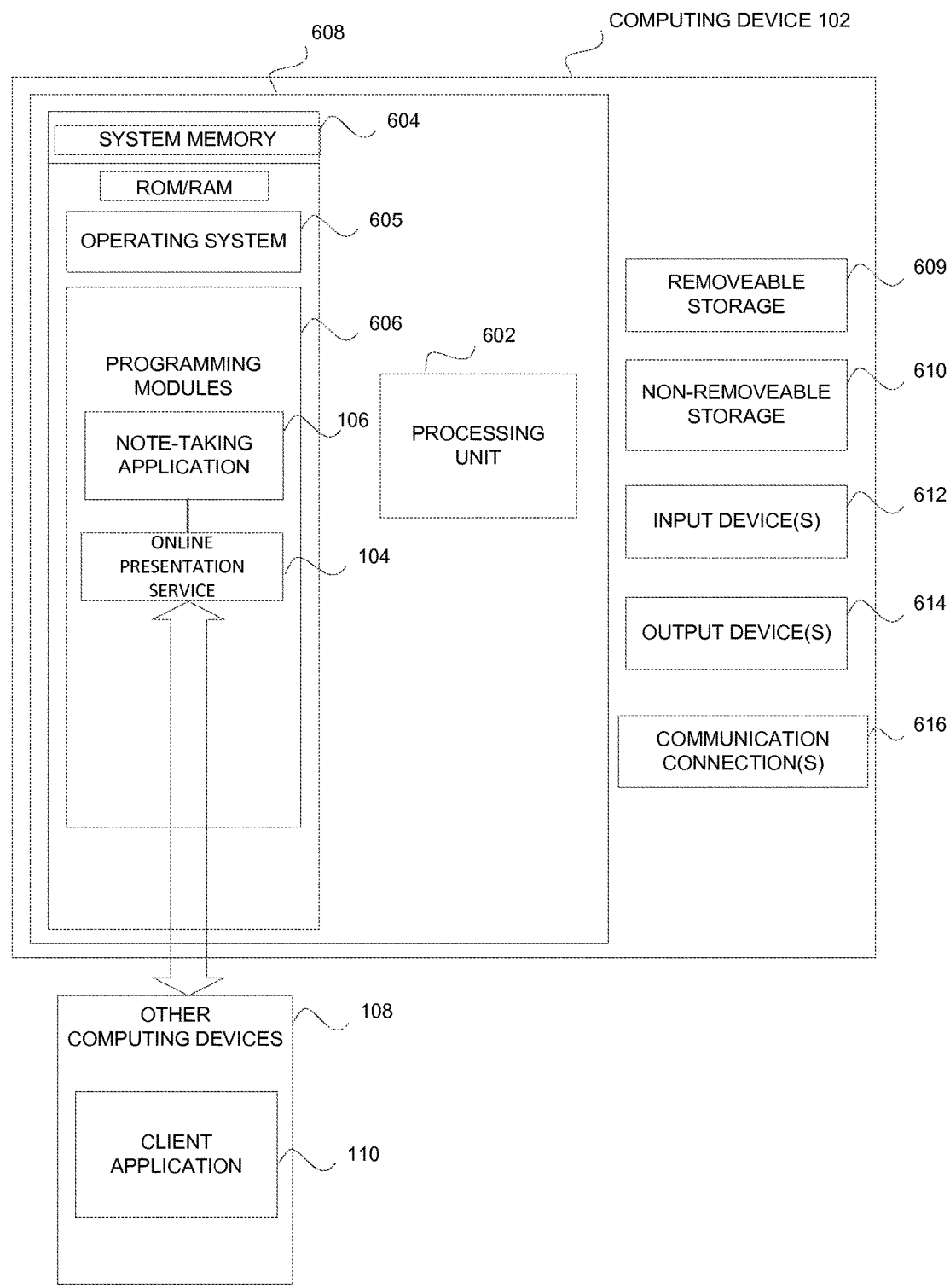
FIG. 6 is a simplified block diagram of a computing system in which embodiments of the present invention may be practiced.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. FIG. 6 and its associated description provide a discussion of a variety of operating environments in which embodiments may be practiced. However, the devices and systems illustrated and discussed with respect to FIG. 6 are for purposes of example and illustration and are not limiting of a vast number of computing device configurations that may be utilized for practicing embodiments, described herein.

FIG. 6 is a block diagram illustrating example physical components of a computing device (e.g., first computing device 102) with which embodiments may be practiced. In a basic configuration, computing device 102 may include at least one processing unit 602 and a system memory 604. Depending on the configuration and type of computing device, system memory 604 may comprise, but is not limited to, volatile (e.g. random access memory (RAM)), non-volatile (e.g. read-only memory (ROM)), flash memory, or any combination. System memory 604 may include operating system 605 and one or more programming modules 606. Operating system 605, for example, may be suitable for controlling the operation of computing device 102. Furthermore, embodiments may be practiced in conjunction with a graphics library, other operating systems, or any other application program and is not limited to any particular application or system. This basic configuration is illustrated in FIG. 6 by those components within a dashed line 608.

Computing device 102 may have additional features or functionality. For example, computing device 102 may also include additional data storage devices (removable and/or non-removable) such as, for example, magnetic disks, optical disks, or tape. Such additional storage is illustrated in FIG. 6 by a removable storage 609 and a non-removable storage 610.

As stated above, a number of program modules and data files may be stored in system memory 604, including operating system 605. While executing on processing unit 602, programming modules 606 may perform processes including, for example, one or more of the processes described above with reference to FIGS. 1-5. The aforementioned processes are an example, and processing unit 602 may perform other processes. Other programming modules that may be used in accordance with embodiments may include client application 110, such as electronic mail and contacts applications, word processing applications, spreadsheet applications, database applications, slide presentation applications, drawing or computer-aided application programs, etc.

Generally, consistent with embodiments, program modules may include routines, programs, components, data structures, and other types of structures that may perform particular tasks or that may implement particular abstract data types. Moreover, embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network. In a distributed computing environment, program modules may be located in both local and remote memory storage devices.

Furthermore, embodiments may be practiced in an electrical circuit comprising discrete electronic elements, packaged or integrated electronic chips containing logic gates, a circuit utilizing a microprocessor, or on a single chip containing electronic elements or microprocessors. For example, embodiments may be practiced via a system-on-a-chip (SOC) where each or many of the components illustrated in FIG. 6 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein may be operated via application-specific logic integrated with other components of the computing device/system 102 on the single integrated circuit (chip). Embodiments may also be practiced using other technologies capable of performing logical operations such as, for example, AND, OR, and NOT, including but not limited to mechanical, optical, fluidic, and quantum technologies. In addition, embodiments may be practiced within a general purpose computer or in any other circuits or systems.

Embodiments, for example, may be implemented as a computer process (method), a computing system, or as an article of manufacture, such as a computer program product or computer-readable storage medium. The computer program product may be a computer-readable storage medium readable by a computer system and encoding a computer program of instructions for executing a computer process. The term computer-readable storage medium as used herein may include computer storage media. Computer storage media may include volatile and nonvolatile, removable and non-removable media implemented in any method or technology for storage of information, such as computer-readable instructions, data structures, program modules, or other data. System memory 604, removable storage 609, and non-removable storage 610 are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by computing device 102. Any such computer storage media may be part of device 102. Computing device 102 may also have input device(s) 612 such as a keyboard, a mouse, a pen, a sound input device, a touch input device, etc. Output device(s) 614 such as a display, speakers, a printer, etc. may also be included. The aforementioned devices are examples and others may be used.

Communication media may be embodied by computer-readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include a communication connection(s) 616, which may be wired media such as a wired network or direct-wired connection, and/or wireless media such as acoustic, radio frequency (RF), infrared, and other wireless media.

Embodiments herein may be used in connection with mobile computing devices alone or in combination with any number of computer systems, such as in desktop environments, laptop or notebook computer systems, multiprocessor systems, micro-processor based or programmable consumer electronics, network PCs, mini computers, main frame computers and the like. Embodiments may also be practiced in distributed computing environments where tasks are performed by remote processing devices that are linked through a communications network in a distributed computing environment; programs may be located in both local and remote memory storage devices. To summarize, any computer system having a plurality of environment sensors, a plurality of output elements to provide notifications to a user and a plurality of notification event types may incorporate embodiments.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-5. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data can also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

It will be apparent to those skilled in the art that various modifications or variations may be made to embodiments without departing from the scope or spirit. Other embodiments are apparent to those skilled in the art from consideration of the specification and practice of the embodiments disclosed herein.

What is claimed:

1. A system comprising:
   at least one processor; and
   a memory operatively connected with the processor, wherein the memory stores computer-executable instructions, that when executed, perform operations that comprise:
      receiving a request to create a note file in a note-taking application executing on the system;
      receiving user content for the note file;
      creating, by the at least one processor, the note file comprising the received user content for the note file;
      in response to receiving the user content, transmitting, by the at least one processor, a request for presentation information associated with a presentation of a document from the note-taking application to a web-based presentation service;
      receiving the presentation information from the web-based presentation service, wherein the presentation information comprises:
         at least a portion of a content of the document; and
         a context associated with the presentation of the document by the web-based presentation service;
      associating the presentation information with the user content in the note file; and
      displaying, in the note-taking application, the created note file including the user content and the presentation information.

2. The system according to claim 1, wherein the operations further comprise storing the created note file.

3. The system according to claim 1, wherein the context associated with the presentation of the document by the web-based presentation service comprises location information.

4. The system according to claim 1, wherein the operations further comprise transmitting, via the web-based presentation service, the created note file to a client application executing on another processing device.

5. The system according to claim 1, wherein the operations further comprise sharing the created note file with at least one other processing device.

6. The system according to claim 1, wherein the operations further comprise:
   receiving an update to the created note file via the web-based presentation service; and
   modifying the created note file.

7. The system according to claim 1, wherein the operations further comprise:
   modifying the created note file; and
   transmitting the modified note file to at least one additional processing device.

8. The system according to claim 7, wherein the note-taking application is connected with the web-based presentation service, and the transmitting further comprises transmitting the modified note file to the web-based presentation service for distribution to the additional processing device.

9. The system according to claim 1, wherein the note-taking application is connected with the web-based presentation service, and wherein the web-based presentation service retrieves at least a portion of the presentation information from a client application executing on another processing device and relays the at least a portion of the presentation information to the note-taking application.

10. A computer-implemented method comprising:
    executing, at least in part on a processing device, a note-taking application and a web-based presentation service;
    receiving a request to display a note file, wherein the note file comprises user content and relates to a presentation of a document by the web-based presentation service;
    in response to the request, transmitting, by the processing device, a request for presentation information associated with the presentation of the document from the note-taking application to the web-based presentation service;
    receiving the presentation information from the web-based presentation service, wherein the presentation information comprises:
       at least a portion of a content of the document; and
       a context associated with the presentation of the document;
    associating the presentation information with the user content in the note file; and
    displaying, using the note-taking application, the note file including the user content and the presentation information.

11. The computer-implemented method according to claim 10, further comprising storing the note file including the presentation information.

12. The computer-implemented method according to claim 10, further comprising transmitting the note file including the presentation information to the web-based presentation service for distribution.

13. The computer-implemented method according to claim 10, wherein the context associated with the presentation of the document comprises location information.

14. The computer-implemented method according to claim 10, further comprising sharing the note file with at least one other processing device.

15. The computer-implemented method according to claim 10, further comprising:

receiving an update to the note file via the web-based presentation service; and updating the note file.

16. The computer-implemented method according to claim 10, further comprising:

updating the note file; and transmitting the updated note file to at least one additional processing device.

17. The computer-implemented method according to claim 16, wherein the note-taking application is connected with the web-based presentation service, and the transmitting further comprises transmitting the updated note file to the web-based presentation service for distribution to the additional processing device.

18. The computer-implemented method according to claim 10, wherein the note-taking application is connected with the web-based presentation service, and wherein the web-based presentation service retrieves at least a portion of the presentation information from a client application running on another processing device.

19. A computer-readable storage device comprising executable instructions, that, when executed by a processor, cause the processor to execute operations that comprise:

receiving a request from a note-taking application, wherein the request comprises a request for document information associated with a presentation of a document by a web-based presentation service;

requesting, by the processor, the document information from a client application that stores the document based on the request received from the note-taking application;

receiving the document information from the client application, wherein the document information comprises at least a portion of a content of the document; and transmitting, by the processor, presentation information from the web-based presentation service to the note-taking application, wherein the presentation information comprises:

the document information; and a context associated with the presentation of the document by the web-based presentation service.

20. The computer-readable storage device according to claim 19, wherein the operations further comprise:

receiving a created note file from the note-taking application, wherein the created note file comprises the document information and the context;

providing an update to the note-taking application for at least one of the document information and the context; and receiving an updated note file from the note-taking application based on the update.

* * * * *